United States Patent
Sakai et al.

(10) Patent No.: US 11,418,565 B2
(45) Date of Patent: Aug. 16, 2022

(54) SPACE INFORMATION SHARING APPARATUS, SPACE INFORMATION SHARING METHOD, AND PROGRAM

(71) Applicant: SONY CORPORATION, Tokyo (JP)

(72) Inventors: Yusuke Sakai, Kanagawa (JP); Yoshizumi Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/045,616

(22) PCT Filed: Mar. 29, 2019

(86) PCT No.: PCT/JP2019/013933
§ 371 (c)(1),
(2) Date: Oct. 6, 2020

(87) PCT Pub. No.: WO2019/198541
PCT Pub. Date: Oct. 17, 2019

(65) Prior Publication Data
US 2021/0176291 A1 Jun. 10, 2021

(30) Foreign Application Priority Data
Apr. 13, 2018 (JP) .............................. JP2018-077479

(51) Int. Cl.
*H04L 65/80* (2022.01)
*H04N 7/14* (2006.01)
*H04N 7/15* (2006.01)
*H04L 65/60* (2022.01)

(52) U.S. Cl.
CPC ............ *H04L 65/605* (2013.01); *H04L 65/80* (2013.01); *H04N 7/147* (2013.01); *H04N 7/15* (2013.01)

(58) Field of Classification Search
USPC ...................................................... 348/14.03
See application file for complete search history.

(56) References Cited

U.S. PATENT DOCUMENTS

| 9,787,939 B1 * | 10/2017 | Beguin | .................. H04N 7/141 |
| 9,955,209 B2 * | 4/2018 | Ng | .................... H04N 21/42202 |
| 2002/0161590 A1 * | 10/2002 | Sakakibara | ............ G06Q 10/10 709/204 |

FOREIGN PATENT DOCUMENTS

| JP | 2001-186489 A | 7/2001 |
| WO | WO 2010/021373 A1 | 2/2010 |
| WO | WO 2015/129319 A1 | 9/2015 |

* cited by examiner

*Primary Examiner* — Amal S Zenati
(74) *Attorney, Agent, or Firm* — Paratus Law Group, PLLC

(57) ABSTRACT

There is provided a space information sharing apparatus, a space information sharing method, and a program adapted to let users feel as if their spaces are interconnected in a multidirectional communication system while saving bandwidth. A control section is provided to control communication of space information indicative of appearances of a space of a first user to an apparatus of a second user on the basis of first sensing information representative of the state of the first user and second sensing information representative of the state of the second user. This technology is applied advantageously to multidirectional communication systems.

11 Claims, 15 Drawing Sheets

FIG.3
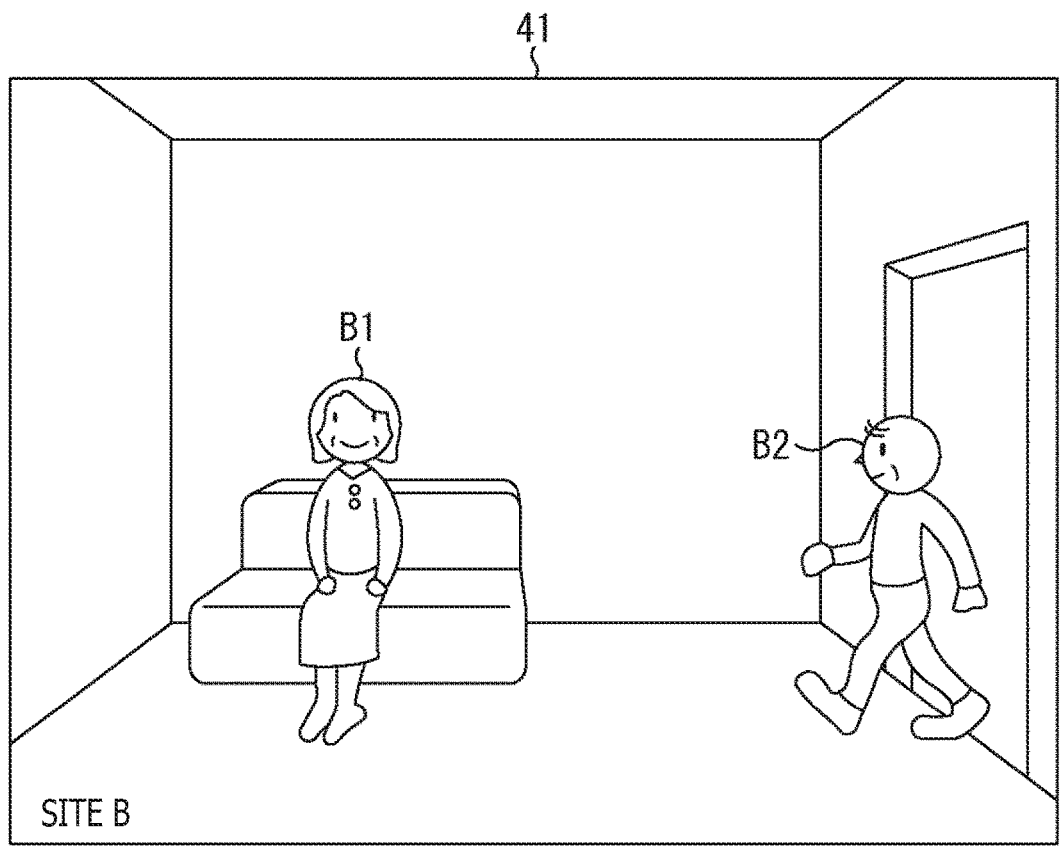
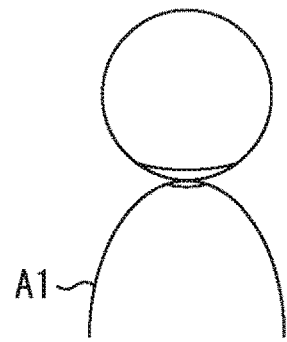

FIG. 11

| | | t0 | t1 | t2 | t3 | t4 | t5 |
|---|---|---|---|---|---|---|---|
| SITE A ⇔ SITE B CONTINUED SENSE OF CONNECTION | STATE | a0 | | | a3 | | a4 |
| | | NORMAL (PRESENT, WATCHING) | | | ABSENT, NOT WATCHING | | NORMAL (PRESENT, WATCHING) |
| SITE B | STATE | b0 | b1 | | b2 | | b5 |
| | | NORMAL | ABSENT, MAY WATCH | | ABSENT, NOT WATCHING | | NORMAL |
| ENERGY-SAVING AND BANDWIDTH-SAVING DETERMINATION | SITE A TO SITE B | | -> RESOLUTION REDUCED | | -> TRANSMISSION STOPPED/ DISPLAY APPARATUS TURNED OFF | | -> RESOLUTION INCREASED/ DISPLAY APPARATUS TURNED ON |
| | SITE B TO SITE A | | | -> FRAME RATE REDUCED | -> TRANSMISSION STOPPED/DISPLAY APPARATUS TURNED OFF | -> TRANSMISSION STARTED/DISPLAY APPARATUS TURNED ON | -> FRAME RATE INCREASED |

FIG.15
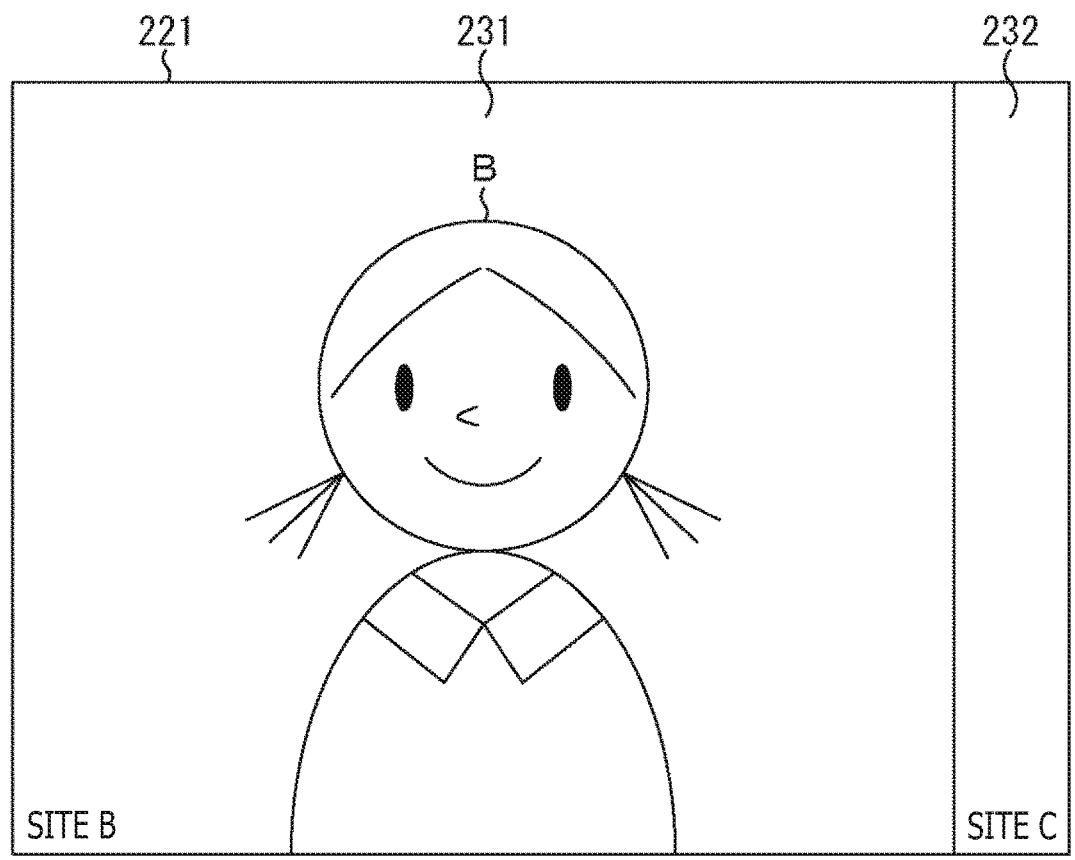
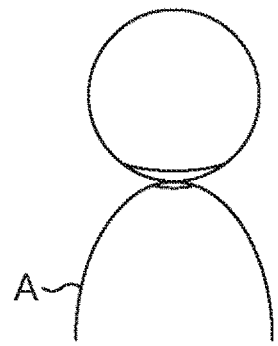

SPACE INFORMATION SHARING APPARATUS, SPACE INFORMATION SHARING METHOD, AND PROGRAM

CROSS REFERENCE TO PRIOR APPLICATION

This application is a National Stage Patent Application of PCT International Patent Application No. PCT/JP2019/013933 (filed on Mar. 29, 2019) under 35 U.S.C. § 371, which claims priority to Japanese Patent Application No. 2018-077479 (filed on Apr. 13, 2018), which are all hereby incorporated by reference in their entirety.

TECHNICAL FIELD

The present technology relates to a space information sharing apparatus, a space information sharing method, and a program. More particularly, the technology relates to a space information sharing apparatus, a space information sharing method, and a program adapted to let users feel as if their spaces are interconnected in a multidirectional communication system while saving bandwidth.

BACKGROUND ART

PTL 1 proposes a technology by which, in a state where a user is presented with a TV program, devices are controlled to save energy depending on whether or not the user is watching the program as determined on the basis of face information acquired by a camera capturing the user.

CITATION LIST

Patent Literature

[PTL 1]
PCT Patent Publication No. 2010/021373

SUMMARY

Technical Problem

The technology described in PTL 1 addresses TV broadcasting systems handling unidirectional communication. Energy is thus saved only on terminals at the receiving end of TV programs.

The present technology has been devised in view of the above circumstances and is aimed at allowing users to feel as if their spaces are interconnected in a multidirectional communication system while saving bandwidth.

Solution to Problem

According to a first aspect of the present technology, there is provided a space information sharing apparatus including a control section configured to control communication of space information indicative of appearances of a space of a first user to an apparatus of a second user, on the basis of first sensing information representative of a state of the first user and second sensing information representative of a state of the second user.

Thus, according to the first aspect of the present technology, the communication of the space information indicative of the appearances of the space of the first user to the apparatus of the second user is controlled on the basis of the first sensing information representative of the state of the first user and the second sensing information representative of the state of the second user.

Advantageous Effects of Invention

According to the present technology, users are allowed to feel as if their spaces are interconnected in a multidirectional communication system while bandwidth is saved.

The advantageous effects outlined above are not limitative of the present disclosure. Further advantages will become apparent from a reading of the present disclosure.

BRIEF DESCRIPTION OF DRAWINGS

FIG. 3 is a view depicting another example of the output information.
FIG. 11 is a view depicting a typical energy-saving and bandwidth-saving determination process performed in the case where context information indicative of the states in FIG. 10 is shared.
FIG. 15 is a view depicting another example of the output information.

DESCRIPTION OF EMBODIMENTS

Some embodiments for implementing the present technology are described below. The description will be given in the following order.
1. System overview
2. Configuration and operation of information processing apparatus
3. Operation details
4. Alternative examples
5. Conclusion
6. Others

1. System Overview

<Configuration Example of Multidirectional Communication System>

Figure 1:
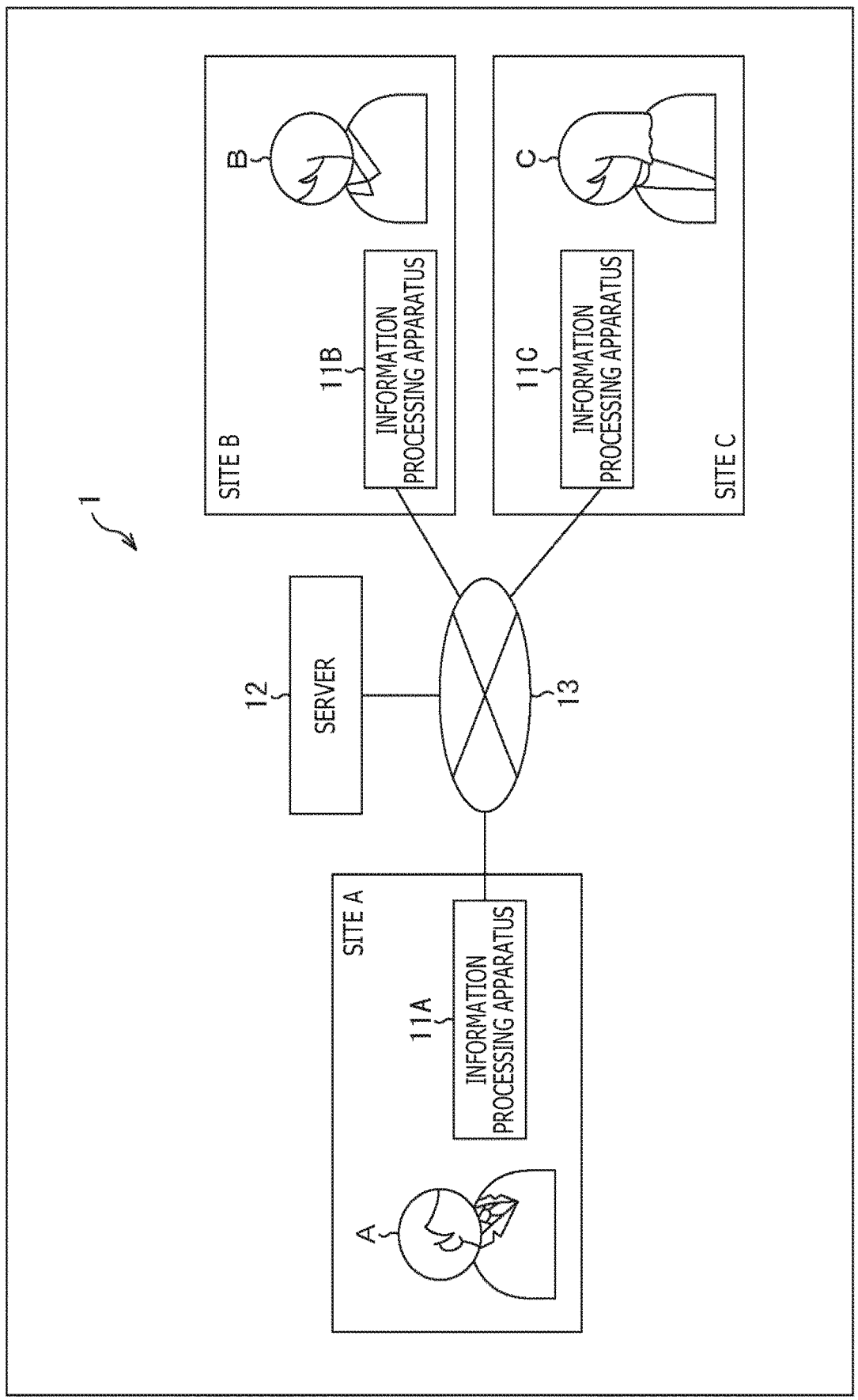
FIG. 1 is a view depicting a multidirectional communication system to which the present technology is applied.

FIG. 1 is a view depicting a multidirectional communication system to which the present technology is applied.

As depicted in FIG. 1, a multidirectional communication system 1 includes information processing apparatuses 11A to 11C and a server 12 being interconnected via a network 13 such as the Internet.

The information processing apparatuses 11A, 11B, and 11C are arranged at sites A, B, and C, respectively, the site A being a space of a user A, the site B being a space of a user B, the site C being a space of a user C. The information processing apparatuses 11A, 11B, and 11C are apparatuses that connect the spaces of the users through channels of video, audio, and other information in a manner allowing the users to feel as if their spaces are connected to one another.

For example, the information processing apparatuses 11A, 11B, and 11C allow parents and their children living separately to feel as if their living rooms in separate houses are interconnected via display apparatuses corresponding to windows or doors. With their living rooms thus made to appear interconnected, the users A to C may live their lives feeling reassured by keeping tabs on how the other users (e.g., children or parents) are doing.

Producing the sense of connection is achieved by getting the information processing apparatuses 11A, 11B, and 11C to exchange therebetween space information indicative of the appearances of each of the spaces involved. The space information includes spatial image information captured by cameras and spatial audio information collected by microphones. In such a manner, the information processing apparatuses 11A, 11B, and 11C function as space information sharing apparatuses that share the space information among them.

This type of multidirectional communication system 1 configured as described above is expected to further advance in communication technology for higher quality, larger capacity, and more multi-stream options so as to deal with higher communication loads and wider bandwidth, in an accelerated manner.

In the multidirectional communication system 1, context information acquired by the respective information processing apparatuses is shared among them. Sharing of the context information permits optimization of device control over the configured apparatuses and of communication bandwidth availability among them with a view to saving energy and bandwidth based on the states of multiple users. The context information is indicative of the states of the users acquired by sensing. The states of the users include the states of the user's spaces.

For example, the information processing apparatuses 11A, 11B, and 11C perform a space information transmission and reception process, an energy-saving and bandwidth-saving determination process, an energy-saving and bandwidth-saving control process, and an output process as processes for optimizing device control or communication bandwidth to save energy and bandwidth. At least some of these processes may be carried out by the server 12. While the example in FIG. 1 is a configuration in which the multidirectional communication system 1 includes the server 12, the server 12 may be omitted from the configuration.

This allows the users, in using the multidirectional communication system 1 every day, to obtain a comfortable sense of connection without performing deliberate operations such as turning ON/OFF the connection. The sense of connection is a sensation that makes people feel as if their spaces are connected. In other words, the sense of connection may otherwise be considered to be an ease of mind or a sense of coexistence.

The multidirectional communication system 1 may be configured by connecting two sites to each other.

Alternatively, the multidirectional communication system 1 may be configured by interconnecting multiple sites of three or more locations.

In the description that follows, the information processing apparatuses 11A to 11C will be generically referred to as the information processing apparatus 11 where there is no need to distinguish the apparatuses from one another.

<Examples of Output Information>

Figure 2:
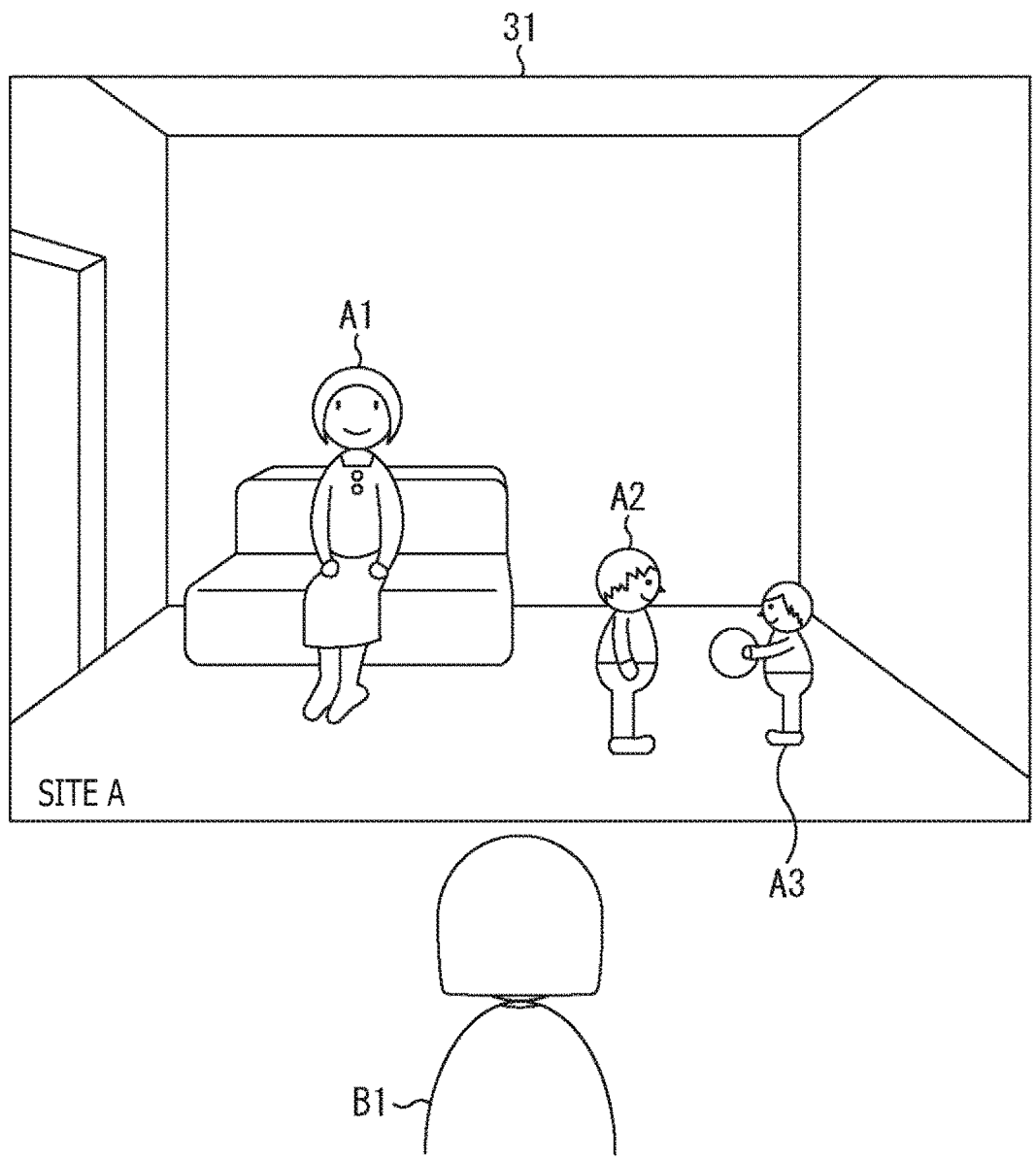
FIG. 2 is a view depicting an example of output information.

FIG. 2 is a view depicting an example of output information.

In the example of FIG. 2, at the site B as the space of a user B1, spatial image information indicative of the appearances of the space of the site A as the communication destination is displayed as output information 31. The output information 31 is displayed by the information processing apparatus 11B arranged at the site B. It is assumed that users A1 to A3 are present at the site A. Incidentally, the aspect ratio of the spatial image information can be selected freely.

For example, the user A1 captured in the output information 31 is a mother raising small children, i.e., users A2 and A3. In the example of FIG. 2, the user A1 is assumed to be interested in the site B where the user B1 is present and to be watching the spatial image information regarding the site B displayed on a display apparatus in front of the user A1. The spatial image information displayed on the display apparatus in front of the user A1 is indicative of the appearances of the site B. The spatial image information indicating the appearances of the site B has the user B1 captured therein, as will be discussed later. Also in the example of FIG. 2, the users A2 and A3 are assumed to be not interested in the spatial image information regarding the site B and playing for themselves.

FIG. 3 is a view depicting another example of the output information.

In the example of FIG. 3, at the site A as the space of the user A1, spatial image information indicative of the appearances of the space of the site B as the communication destination is displayed as output information 41. The output information 41 is displayed by the information processing apparatus 11A arranged at the site A. It is assumed that the user B1 and a user B2 are present at the site B.

For example, the user B1 is the mother of the user A1 and the grandmother of the users A2 and A3. The user B2 is the father of the user A1 and the grandfather of the users A2 and A3. In the example of FIG. 3, the user B1 is assumed to be interested in the site A and to be watching the spatial image information (output information 31 in FIG. 2) regarding the site A displayed on a display apparatus in front of the user B1. The user B2 is entering, through the door, the space in which the user B1 is present.

With such output information displayed continuously in real time, the users at remote locations are able to feel as if they are in adjoining rooms.

2. Configuration and Operation of Information Processing Apparatus

<Configuration of Information Processing Apparatus>

Figure 4:
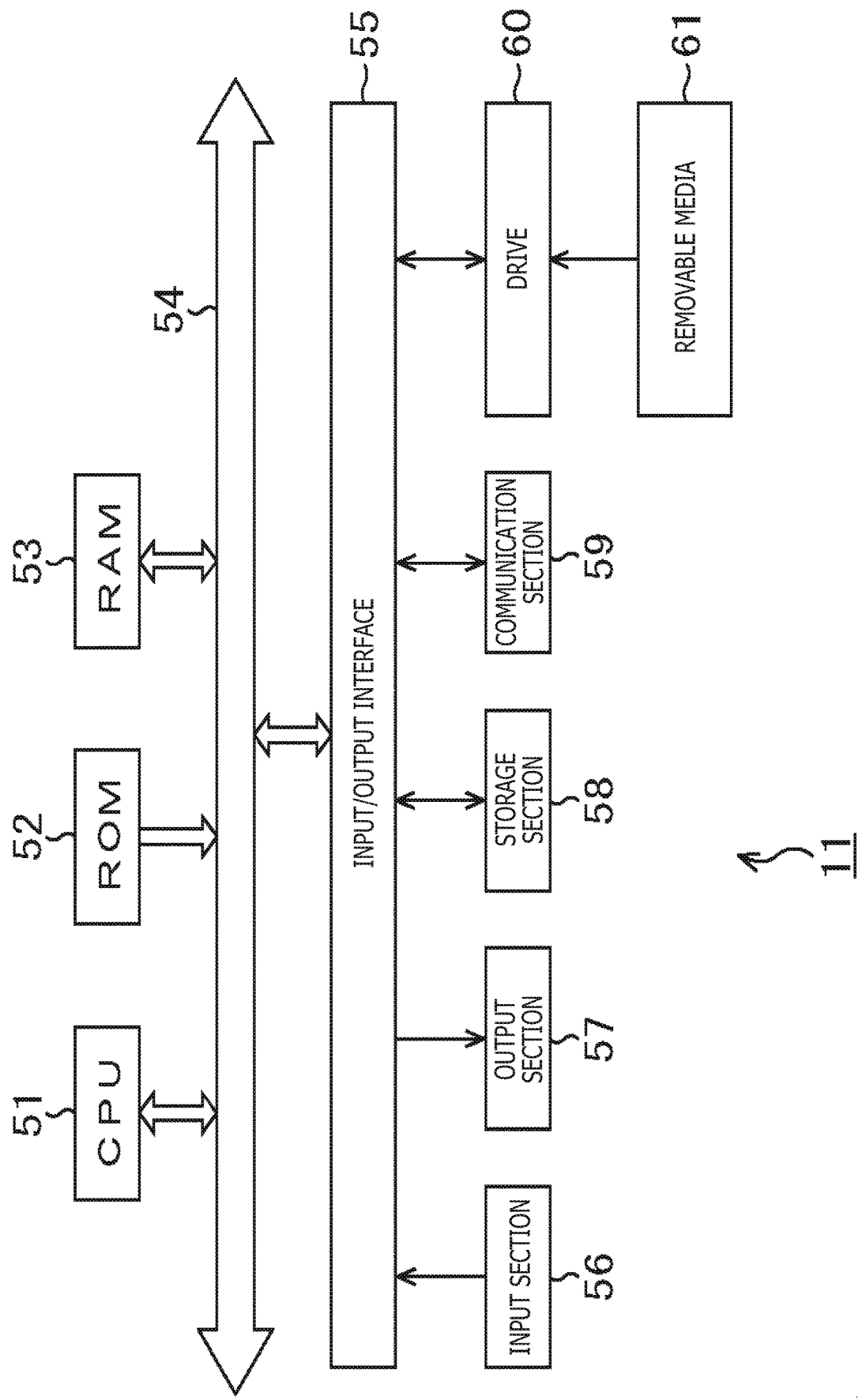
FIG. 4 is a block diagram depicting a hardware configuration example of an information processing apparatus.

FIG. 4 is a block diagram depicting a hardware configuration example of the information processing apparatus 11.

A CPU 51, a ROM 52, and a RAM 53 are interconnected via a bus 54. The bus 54 is further connected with an input/output interface 55.

The input/output interface 55 is connected with an input section 56, an output section 57, a storage section 58, a communication section 59, and a drive 60.

The input section 56 acquires space information. The space information obtained by the input section 56 includes, for example, information such as images, sounds, environmental data, texts, haptic sensations, and odor in the user's space. The user's space is not limited to that in which the user is present and includes a space such as a room associated with the user (who may not be present therein).

The space information also includes information indicative of the appearances of the space such as brightness, largeness, and height of the space; air flows, temperature, humidity, and environmental sounds in the space; and the state of the information processing apparatus 11. The space information further includes information indicative of the user's state such as the user's position, the distance between the user and the display area of output information, user's movement, user's point of gaze, the number and composition of users in the same space, and users' postures.

The input section 56 includes a camera for capturing the status of the surroundings, a microphone for picking up ambient sounds, and sensors. The sensors detect diverse information in the space and its surroundings. For example, the sensors include physical sensors such as a temperature sensor, a humidity sensor, an illuminance sensor, an odor sensor, a human presence sensor, a vibration sensor, an air flow sensor, and a door opening and closing sensor; and IoT sensors installed in home automation systems, buildings, and urban infrastructure systems.

There may be provided not one but multiple cameras, microphones, and sensors. The combination of sensors installed in the information processing apparatus 11 may be changed as desired. As another alternative, the information obtained by cameras, microphones, or sensors not constituting part of the information processing apparatus 11 but installed outside thereof may be acquired by the input section 56.

The output section 57 includes a display apparatus such as a display unit or a projector, an audio output apparatus such as speakers, and a notification apparatus such as LED lamps or indicators.

The storage section 58 includes a hard disk or a nonvolatile memory. In addition to the programs to be executed by the CPU 51, the storage section 58 stores diverse data including the context information and space information.

The communication section 59 includes a network interface. The communication section 59 is connected to the network 13 by wired or wireless communication and communicates with the other information processing apparatuses 11 on a P2P basis or via the server 12.

The drive 60 drives removable media 61 to write and read data thereto and therefrom.

The server 12 has the same configuration as that depicted in FIG. 4.

<Functional Configuration of Information Processing Apparatus>

Figure 5:
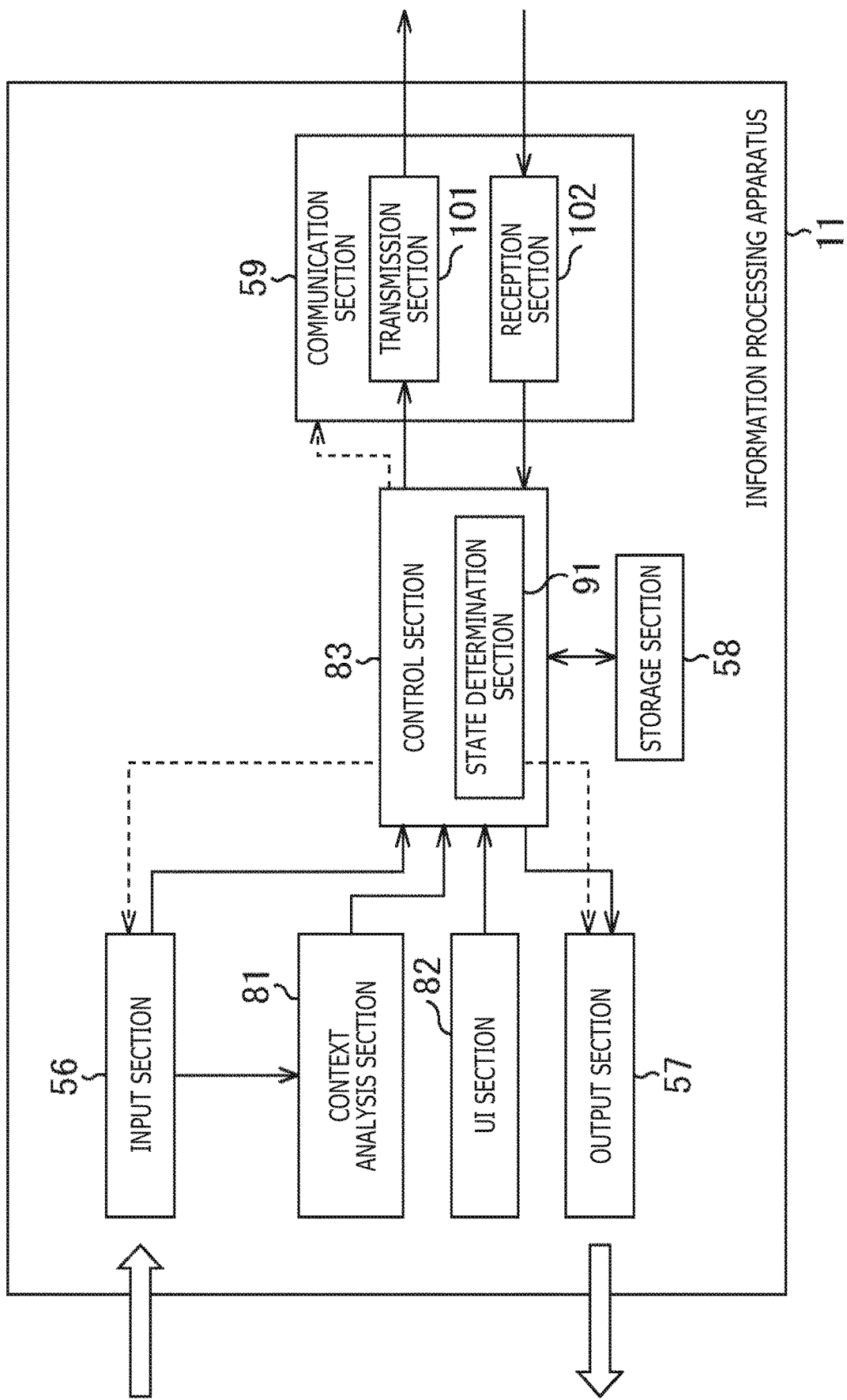
FIG. 5 is a block diagram depicting a functional configuration example of the information processing apparatus.

FIG. 5 is a block diagram depicting a functional configuration example of the information processing apparatus 11.

At least some of the functional blocks depicted in FIG. 5 are implemented by the CPU 51 in FIG. 4 executing relevant predetermined programs. In FIG. 5, the functional blocks corresponding to those in FIG. 4 are designated by the same reference signs. Redundant explanations of these functions are omitted where appropriate. In FIG. 5, solid line arrows indicate data flows, and broken line arrows denote control relations.

As depicted in FIG. 5, a context analysis section 81, a UI (User Interface) section 82, and a control section 83 are implemented by the information processing apparatus 11. The communication section 59 includes a transmission section 101 and a reception section 102.

The context analysis section 81 uses and analyzes the image information, audio information, physical sensor information, and IoT sensor information supplied from the input section 56, or at least some of these items of information in combination, in order to generate the context information resulting from the analysis.

The image information is obtained by the camera capturing faces, persons, movements, the environment, and states of things. The audio information is acquired by the microphone picking up voices, conversations, sounds, the environment, and sound fields. The physical sensor information is information regarding vibrations, airflows, heat, and illuminance. The IoT sensor information is information detected by sensors installed in home automation systems, buildings, and urban infrastructure systems.

As described above, the context information is obtained by sensing and indicates the states of the users. The context information acquired by performance of analysis by the context analysis section 81 is supplied to the control section 83.

The UI section 82 includes a remote controller or a controller. The UI section 82 outputs to the control section 83 operating information corresponding to the user's operations.

The control section 83 functions as an arithmetic processing unit and a control apparatus. The control section 83 controls the operation of the information processing apparatus 11 as a whole in accordance with various programs. The control section 83 includes a state determination section 91. The control section 83 provides device control and communication control corresponding to the result of determination by the state determination section 91.

In terms of device control, for example, the control section 83 performs processes to control the workings of the devices constituting at least one of the input section 56, the output section 57, or the communication section 59. In terms of communication control, for example, the control section 83 performs processes to change parameters related to communication bandwidth such as frame rate and image resolution.

The state determination section 91 performs an energy-saving and bandwidth-saving determination process using the context information supplied from the context analysis section 81 and the context information regarding the communication destination fed from the reception section 102. The above-mentioned device control and communication control are carried out on the basis of the result of the energy-saving and bandwidth-saving determination process.

In such a manner, the energy-saving and bandwidth-saving determination process, device control, and communication control are carried out by combining the states of multiple users. Performing such processing based on the states of multiple users helps reduce the user's feelings of discomfort caused typically by disruptions of images or sounds and unlit backlight, which are characteristics of the existing energy-saving control. Specific examples of the processing will be explained later with reference to FIG. 8 and other figures.

The transmission section 101 transmits the space information and context information supplied from the control section 83 to the information processing apparatus 11 as the communication destination.

The reception section 102 receives the space information and context information sent from the communication-destination information processing apparatus 11 and outputs the received information to the control section 83. The space information received by the reception section 102 indicates the appearances of the space in which the communication-destination information processing apparatus 11 is installed. The context information indicates the user's state obtained by sensing.

<Operation of the Multidirectional Communication System>

Figure 6:
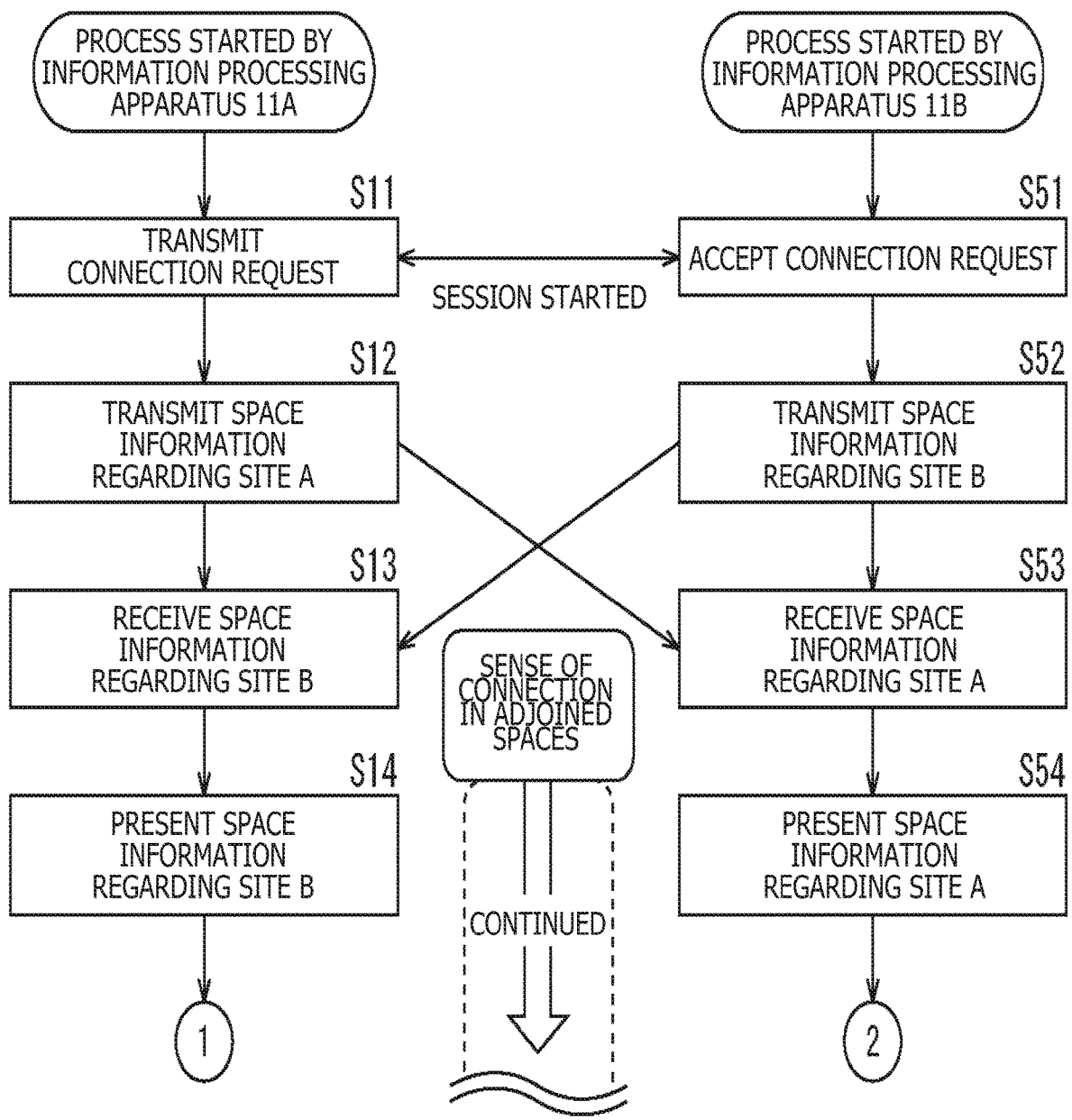
FIG. 6 is a flowchart explaining a space connection process performed by the multidirectional communication system.
Figure 7:
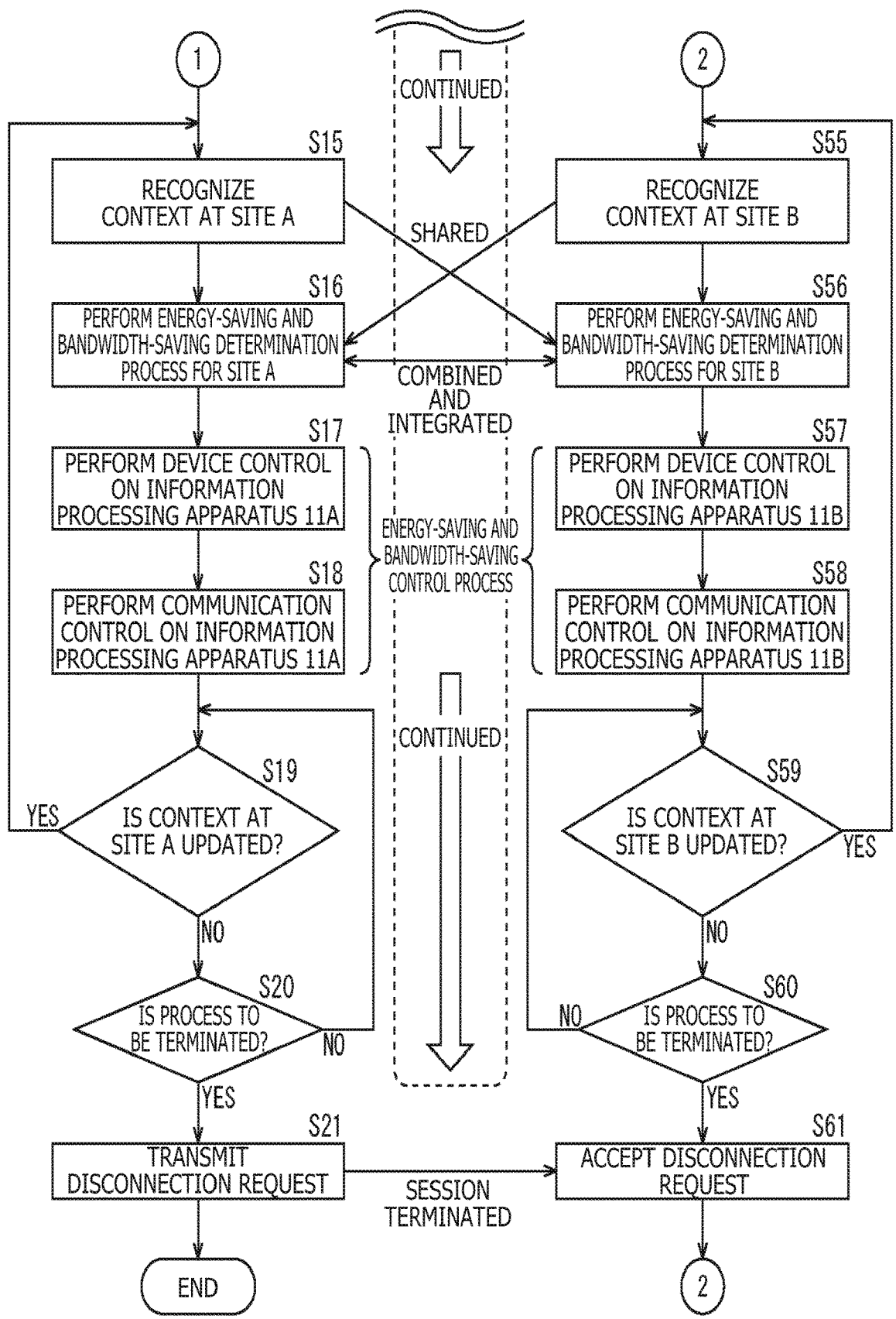
FIG. 7 is a flowchart continued from FIG. 6 and further explaining the space connection process performed by the multidirectional communication system.

FIGS. 6 and 7 are flowcharts explaining a space connection process performed by the multidirectional communication system 1.

FIGS. 6 and 7 depict the space connection process carried out by the information processing apparatuses 11A and 11B. The information processing apparatuses 11A and 11B are installed at different sites. The user of the information processing apparatus 11A is the user A, and the user of the information processing apparatus 11B is the user B.

In step S11, the transmission section 101 of the information processing apparatus 11A transmits a connection request to the information processing apparatus 11B.

In turn, in step S51, the reception section 102 of the information processing apparatus 11B accepts the connection request from the information processing apparatus 11A. The processing of steps S11 and S51 starts a session between the information processing apparatuses 11A and 11B.

In step S12, the transmission section 101 of the information processing apparatus 11A transmits to the information processing apparatus 11B the space information regarding the site A, which is the space of the user A.

Meanwhile, in step S52, the transmission section 101 of the information processing apparatus 11B transmits to the information processing apparatus 11A the space information regarding the site B, which is the space of the user B.

In step S13, the reception section 102 of the information processing apparatus 11A receives from the information processing apparatus 11B the space information regarding the site B, which is the space of the user B.

In step S53, the reception section 102 of the information processing apparatus 11B receives from the information processing apparatus 11A the space information regarding the site A, which is the space of the user A.

In step S14, the output section 57 of the information processing apparatus 11A presents the space information regarding the site B. The space information regarding the site B received by the reception section 102 is supplied to the output section 57 via the control section 83. Specifically, the display apparatus of the output section 57 presents an image corresponding to the spatial image information regarding the site B, and the speakers of the output section 57 present sounds corresponding to the spatial audio information regarding the site B.

Similar processing is also carried out on the side of the information processing apparatus 11B. That is, in step S54, the output section 57 of the information processing apparatus 11B presents the space information regarding the site A.

With the space information regarding the site B presented at the site A and with the space information regarding the site A presented at the site B, the users A and B at the sites A and B obtain a sense of connection and feel as if their spaces are adjacent to each other. The above-described exchange of the space information is continued until the session is terminated.

After the processing of step S14, control of the information processing apparatus 11A is transferred to step S15 in FIG. 7.

In step S15, the state determination section 91 of the information processing apparatus 11A recognizes the context of the site A supplied from the context analysis section 81.

At this time, the transmission section 101 of the information processing apparatus 11A transmits the context information regarding the site A to the information processing apparatus 11B.

Meanwhile, in step S55, the state determination section 91 of the information processing apparatus 11B recognizes the context of the site B supplied from the context analysis section 81.

At this time, the transmission section 101 of the information processing apparatus 11B transmits the context information regarding the site B to the information processing apparatus 11A.

In such a manner, the information processing apparatuses 11A and 11B share therebetween the pieces of context information regarding the sites A and B. This makes it possible, in the next step S16, to perform determination by combining the states of multiple users.

In step S16, the state determination section 91 of the information processing apparatus 11A performs an energy-saving and bandwidth-saving determination process optimal for the site A by combining the user A's state represented by the context information regarding the site A with the user B's state denoted by the context information regarding the site B.

For example, it is possible to calculate mandatory or preferred space information by combining the states of multiple users, in order to obtain the information other than the calculated mandatory or preferred space information. The energy-saving and bandwidth-saving determination process may then be carried out with respect to the information other than the calculated mandatory or preferred information.

In step S16, the processing of integrated determination is performed by use of the pieces of context information regarding the sites A and B shared therebetween.

Note that, if the result of the energy-saving and bandwidth-saving determination process is transmitted from one site to another as needed, it is possible to carry out the determination process more accurately for energy-saving and bandwidth-saving purposes. As another alternative, the results of the energy-saving and bandwidth-saving determination process may be registered in a database in association with the combinations of the states of multiple users. The database may then be used to perform the energy-saving and bandwidth-saving determination process.

In steps S17 and S18, an energy-saving and bandwidth-saving control process for the site A is performed on the basis of the result of the energy-saving and bandwidth-saving determination process performed in the processing of step S16 for the site A.

That is, in step S17, the control section 83 of the information processing apparatus 11A performs device control over the information processing apparatus 11A as the energy-saving and bandwidth-saving control process for the site A. In terms of device control, processes are carried out to control the workings of the devices constituting at least one of the input section 56, the output section 57, or the communication section 59, for example.

In step S18, the control section 83 of the information processing apparatus 11A performs communication control over the information processing apparatus 11A as the energy-saving and bandwidth-saving control process for the site A. In terms of communication control, for example, processes are carried out to change parameters related to communication bandwidth such as frame rate and image resolution.

In step S19, the context analysis section 81 of the information processing apparatus 11A determines whether or not the context at the site A is updated. In the case where it is determined in step S19 that the context at the site A is updated, control is returned to step S15 and the subsequent steps are repeated.

In the case where it is determined in step S19 that the context at the site A is not updated, control is transferred to step S20.

In step S20, the control section 83 of the information processing apparatus 11A determines whether or not to terminate the space connection process, on the basis of the operating information from the UI section 82. In the case where it is determined in step S20 that the space connection process is not to be terminated, control is returned to step S19 and the subsequent steps are repeated.

On the other hand, in the case where it is determined in step S20 that the space connection process is to be terminated, control is transferred to step S21.

Similar processing is also carried out on the side of the information processing apparatus 11B. That is, in step S56, the state determination section 91 of the information processing apparatus 11B performs an energy-saving and bandwidth-saving determination process optimal for the site B by combining the user A's state represented by the context information regarding the site A with the user B's state denoted by the context information regarding the site B.

In steps S57 and S58, the energy-saving and bandwidth-saving control process for the site B is performed on the basis of the result of the energy-saving and bandwidth-saving determination process carried out in the processing of step S56 for the site B.

That is, in step S57, the control section 83 of the information processing apparatus 11B performs device control over the information processing apparatus 11A as the energy-saving and bandwidth-saving control process for the site B.

In step S58, the control section 83 of the information processing apparatus 11B performs communication control over the information processing apparatus 11B as the energy-saving and bandwidth-saving control process for the site B.

In step S59, the context analysis section 81 of the information processing apparatus 11B determines whether or not the context at the site B is updated. In the case where it is determined in step S59 that the context at the site B is updated, control is returned to step S55 and the subsequent steps are repeated.

In the case where it is determined in step S59 that the context at the site B is not updated, control is transferred to step S60.

In step S60, the control section 83 of the information processing apparatus 11B determines whether or not to terminate the space connection process, on the basis of the operating information from the UI section 82. In the case where it is determined in step S60 that the space connection process is not to be terminated, control is returned to step S59 and the subsequent steps are repeated.

In the case where it is determined in step S60 that the space connection process is to be terminated, control is transferred to step S61.

Meanwhile, in step S21, the transmission section 101 of the information processing apparatus 11A transmits a disconnection request to the information processing apparatus 11B.

In turn, in step S61, the control section 83 of the information processing apparatus 11B accepts the disconnection request from the information processing apparatus 11A.

The processing of steps S21 and S61 terminates the session between the information processing apparatuses 11A and 11B. The space connection process of the multidirectional communication system 1 is then brought to an end.

The above-described space connection process makes the users feel as if their spaces are connected to one another. Further, the sharing of multiple items of context information makes it possible to use the states of multiple users in executing device control and communication control based on the energy-saving and bandwidth-saving determination performed on each of the configured apparatuses.

3. Operation Details

Explained below are the details of the context recognition process in steps S15 and S55 of FIG. 7, the energy-saving and bandwidth-saving determination process in steps S16 and S56 of FIG. 7, and the energy-saving and bandwidth-saving control process in steps S17, S18, S57, and S58 of FIG. 7.

<Typical Appearances of the Sites>

Context Recognition Process

Figure 8:
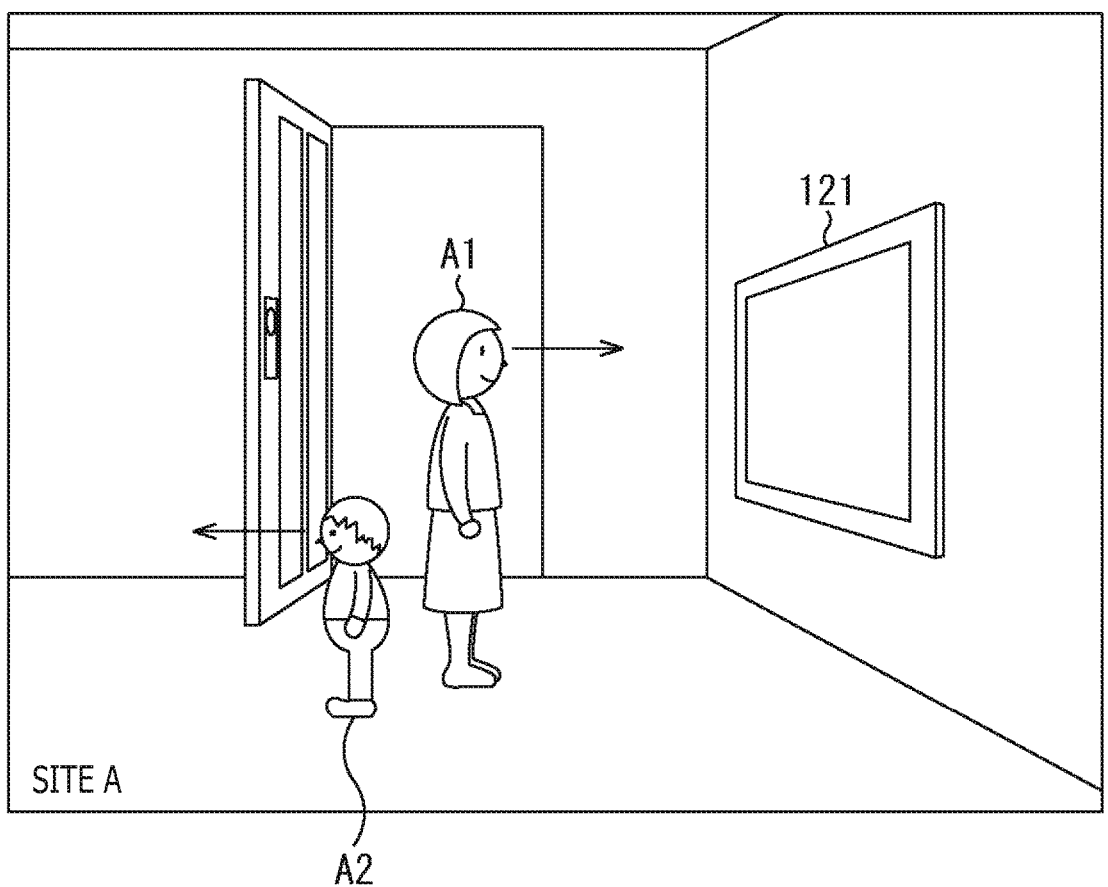
FIG. 8 is a view depicting the appearances of site A.

FIG. 8 is a view depicting the appearances of the site A. As described above, the site A is a living room in which the user A1, among others, is present.

Figure 9:
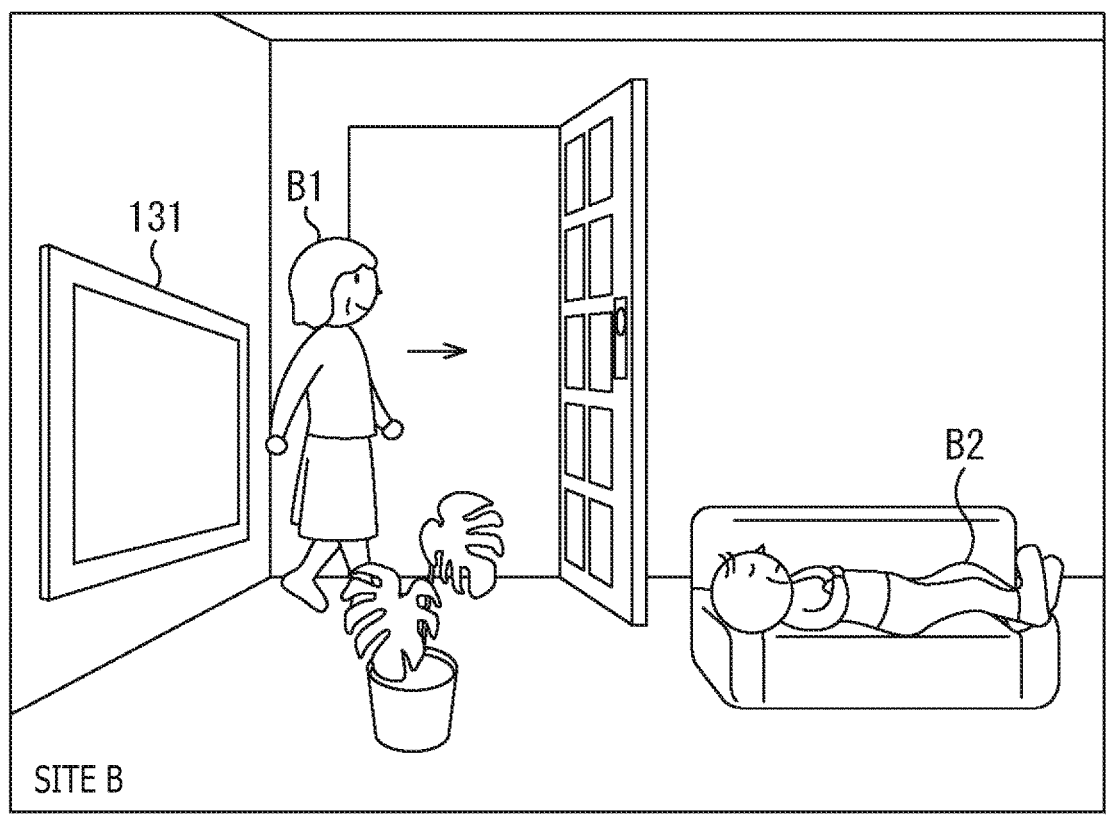
FIG. 9 is a view depicting the appearances of site B.

A display apparatus 121 installed at the site A presents the spatial image information regarding the space in which the users B1 and B2 are present as depicted in FIG. 9. Near the display apparatus 121 is a door. The presentation by the display apparatus 121 is implemented by the information processing apparatus 11A arranged at the site A.

In FIG. 8, the user A1 is watching what is displayed on the display apparatus 121. On the other hand, the user A2 is looking in a direction opposite the installation position of the display apparatus 121.

FIG. 9 is a view depicting the appearances of the site B. As mentioned above, the site B is a living room in which the user B1, among others, is present.

A display apparatus 131 installed at the site B presents the spatial image information regarding the space in which the users A1 and A2 are present as depicted in FIG. 8. Near the display apparatus 131 is a door. The presentation by the display apparatus 131 is implemented by the information processing apparatus 11B arranged at the site B.

After watching the display on the display apparatus 121, the user B1 is about to go out the door to attend to things in another room. Meanwhile, the user B2 is in a state of being asleep on the sofa.

The process of recognizing these states of the users at both sites is performed by both of the information processing apparatuses 11A and 11B as the context recognition process. The context information recognized by the information processing apparatus 11A is transmitted to the information processing apparatus 11B, and the context information recognized by the information processing apparatus 11B is transmitted to the information processing apparatus 11A. The context information is thus shared between the two apparatuses.

Energy-Saving and Bandwidth-Saving Determination Process and Energy-Saving and Bandwidth-Saving Control Process For example, when the user B1 goes out the door as explained above with reference to FIG. 9, there is no user at the site B who is watching the spatial image information regarding the site A. Thus, the information processing apparatus 11A may, in order to save bandwidth, reduce the frame rate of the spatial image information regarding the site A to be transmitted to the information processing apparatus 11B.

The information processing apparatus 11A detects that there remains no user watching the spatial image information regarding the site A owing to the energy-saving and bandwidth-saving determination process based on the context information sent from the information processing apparatus 11B. Also, the process of reducing the frame rate on the basis of the determination result of the energy-saving and bandwidth-saving determination process is carried out as the energy-saving and bandwidth-saving control process. The information processing apparatus 11A continuously transmits, at a reduced frame rate, the spatial image information to the information processing apparatus 11B.

Thereafter, although there is currently no user at the site B who is watching the spatial image information regarding the site A, there is a possibility that the user B1 returns to the site B. There is also a possibility that the user B2 being asleep on the sofa wakes up.

In that case, the information processing apparatus 11A may, in order to save bandwidth, reduce image quality while maintaining the frame rate of the spatial image information regarding the site A to be transmitted to the information processing apparatus 11B.

The information processing apparatus 11A detects that the currently absent user shows up again or that the sleeping user wakes up, owing to the energy-saving and bandwidth-saving determination process based on the context information sent from the information processing apparatus 11B. The possibility of the user B1 returning to the site B or of the user B2 waking up is detected by sensing room noises or by using sensor data from wearable sensors worn by the users.

Also, the process of reducing image quality while maintaining the frame rate based on the determination result of the energy-saving and bandwidth-saving determination process is carried out as the energy-saving and bandwidth-saving control process. The information processing apparatus 11A continuously transmits the spatial image information to the information processing apparatus 11B while maintaining the frame rate of the information with reduced image quality.

Thereafter, at the site B, there is a possibility that the user B1 goes outside, with the user B2 falling fast asleep.

In that case, the information processing apparatus 11B may turn off power to the display apparatus 131 in order to save energy. The information processing apparatus 11B may also transmit to the information processing apparatus 11A a request to stop transmission of the spatial image information.

Owing to the energy-saving and bandwidth-saving determination process based on such context information, the information processing apparatus 11B detects that the user B is not home and the user B2 is fast asleep.

Further, the process of turning off the display apparatus 131 on the basis of the determination result of the energy-saving and bandwidth-saving determination process is carried out as the energy-saving and bandwidth-saving control process. The information processing apparatus 11B leaves the display apparatus 131 turned off.

Meanwhile, at the site A in FIG. 8, the energy-saving and bandwidth-saving determination process and the energy-saving and bandwidth-saving control process are also carried out in a similar manner.

That is, at the site A, the user A1 is watching the spatial image information regarding the site B. The information processing apparatus 11B is required to maintain the image quality and resolution of the spatial image information regarding the site B transmitted to the information processing apparatus 11A. In the case where the user A1 stops watching the spatial image information regarding the site B, the information processing apparatus 11B may reduce the image quality of the spatial image information regarding the site B in order to save bandwidth.

Owing to the energy-saving and bandwidth-saving determination process based on such context information transmitted from the information processing apparatus 11A, the information processing apparatus 11B detects that there is no user watching the spatial image information regarding the site B. Also, the process of reducing the image quality based on the determination result of the energy-saving and bandwidth-saving determination process is carried out as the energy-saving and bandwidth-saving control process. The information processing apparatus 11B continuously transmits the spatial image information to the information processing apparatus 11A with the image quality reduced.

Thereafter, at the site A, there is a possibility that the user A1 as well as the user A2 go outside.

In that case, the information processing apparatus 11A may perform a suspend operation to put the display apparatus 131 in a sleep state.

The information processing apparatus 11A detects that the users are not home, owing to the energy-saving and bandwidth-saving determination process based on the context information sent from the information processing apparatus 11B. Further, the process of turning off the display apparatus 131 on the basis of the determination result of the energy-saving and bandwidth-saving determination process is carried out as the energy-saving and bandwidth-saving control process.

Thereafter, at the site A, there is a possibility that the user A1 as well as the user A2 come home.

In that case, the information processing apparatus 11A has recourse to IoT sensors, for example, which detect the common vestibule door of the apartment building being opened when the users A1 and A2 come home, in the energy-saving and bandwidth-saving determination process based on the context information sent from the information processing apparatus 11B.

The information processing apparatus 11A may further predict the users' eventual return to the site A following a certain time period and perform a process of getting the devices and communication ready for operation beforehand.

Owing to the energy-saving and bandwidth-saving determination process based on such context information transmitted from the information processing apparatus 11B, the information processing apparatus 11A detects the users' return to the site A following the certain time period. Furthermore, the process of getting the devices and communication ready for operation beforehand on the basis of the determination result of the energy-saving and bandwidth-saving determination process is carried out as the energy-saving and bandwidth-saving control process.

The above-described energy-saving and bandwidth-saving determination process and energy-saving and bandwidth-saving control process are performed according to the diverse states of the users represented by the context information.

<Typical Appearances of the Sites>

Figure 10:
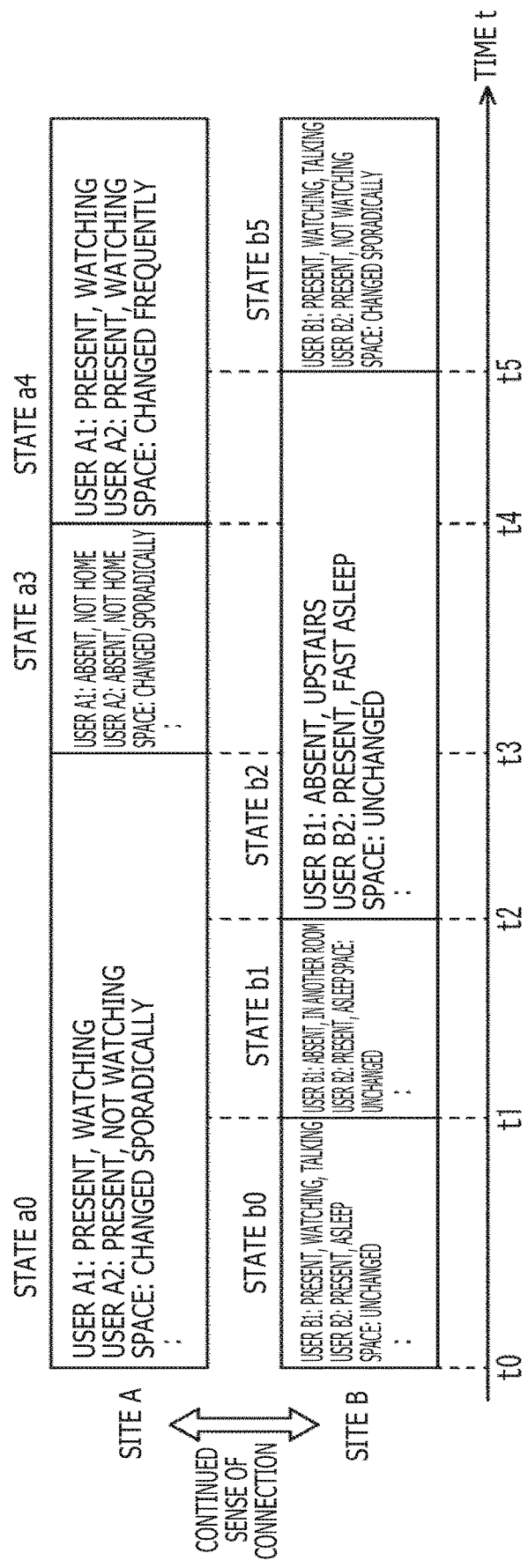
FIG. 10 is a view depicting the time-series of states at site A and site B.

FIG. 10 is a view depicting the time-series of states at the site A and site B.

The upper part of FIG. 10 depicts the time series of states at the site A as recognized by the information processing apparatus 11A. The lower part of FIG. 10 denotes the time series of states at the site B as recognized by the information processing apparatus 11B. These states are represented by the context information generated by the information processing apparatuses 11A and 11B. In this example, the states of the respective users and the states of their spaces are recognized.

The information processing apparatus 11A recognizes the state at time t0 through time t3 as a state a0, and the state at time t3 through time t4 as a state a3.

Further, the state at time t4 and thereafter is recognized as a state a4.

The state a0 for the user A1 is a state in which the user A1 is present at the site A and watching the appearances of the site B. In addition, the state a0 for the user A2 is a state in which the user A2 is present at the site A but not watching the appearances of the site B. The state a0 for the space (living room at the site A) is a state in which objects and the environment are changed sporadically. The state of objects and the environment being changed sporadically may be detected by sensing the swaying of curtains, for example.

Alternatively, the state for the space may be detected on the basis of sensor data from sensors in a robot vacuum cleaner.

The state a3 for the user A1 is a state in which the user A1 is absent from the site A and not home. The state a3 for the user A2 is a state in which the user A2 is also absent from the site A and not home. The state a3 for the space (living room at the site A) is a state in which objects and the environment are changed sporadically. The state in which the users A1 and A2 are not home or a future state in which these users are about to come home may be detected by means of joint security systems of the apartment building or through the use of GPS information from infrastructures such as train stations or from mobile terminals.

The state a4 for the user A1 is a state in which the user A1 is present at the site A and watching the appearances of the site B. In addition, the state a0 for the user A2 is a state in which the user A2 is also present at the site A and watching the appearances of the site B. The state a0 for the space (living room of the site A) is a state in which objects and the environment are changed frequently.

Meanwhile, the information processing apparatus 11B recognizes the state at time t0 through time t1 as a state b0, and the state at time t1 through time t2 as a state b1. In addition, the state at time t2 through t5 is recognized as a state b2. The state at time t5 and thereafter is recognized as a state b5.

The state b0 for the user B1 is a state in which the user B1 is present at the site B, watching the appearances of the site A, and available for a talk. The state b0 for the user B2 is a state in which the user B2 is present at the site B but asleep. The state b0 for the space (living room of the site B) is a state in which there is no change.

The state b1 for the user B1 is a state in which the user B1 is absent from the site B and is in another room. The state b1 for the user B2 is a state in which the user B2 is present at the site B but asleep. The state b1 for the space (living room of the site B) is a state in which there is no change. The position of the user B1 may be detected using, for example, sensors arranged inside the space or at nearby locations. The state of the user B2 being asleep is detected on the basis of voice or vibrations from a wearable terminal or biosensors worn by the user B2, for example.

The state b2 for the user B1 is a state in which the user B1 is absent from the site B and is upstairs. The state b2 for the user B2 is a state in which the user B2 is present at the site B but fast asleep. The state b2 for the space (living room of the site B) is a state in which there is no change.

The state b5 for the user B1 is a state in which the user B1 is present at the site B, watching the appearances of the site A, and available for a talk. The state b5 for the user B2 is a state in which the user B2 is present at the site B but not watching the appearances of the site A. The state b5 for the space (living room of the site B) is a state in which there are sporadic changes. Where else the users are watching or how much of the sound field is recognized by the users may be determined by detecting the lines of sight and face and body orientations of the users and by recognizing obstacles and sounds in the room based on a 3D model and an acoustic model of the room interior.

<Example of Energy-Saving and Bandwidth-Saving Determination at Sites>

FIG. 11 is a view depicting a typical energy-saving and bandwidth-saving determination process performed in the case where the context information indicative of the states in FIG. 10 is shared.

At time t1, the site A is in the normal state a0 in which the user is present and watching the spatial image information regarding the site B. The site B is in the state b1 in which the user is absent but may watch the spatial image information regarding the site A. Thus, for the communication from the site A to the site B, the energy-saving and bandwidth-saving determination process is performed in such a manner as to reduce the resolution of the spatial image information regarding the site A. For the communication from the site B to the site A, the energy-saving and bandwidth-saving determination process is carried out in such a manner as to reduce the frame rate of the spatial image information regarding the site B.

At time t2, the site A is in the state a0 in which the user is present and watching the spatial image information regarding the site B. The site B is in the state b2 in which the user is absent and not watching the spatial image information regarding the site A. Thus, for the communication from the site A to the site B, the energy-saving and bandwidth-saving determination process is performed in such a manner as to stop transmitting the spatial image information regarding the site A. Further, at the site B, the energy-saving and bandwidth-saving determination process is carried out to turn off the display apparatus.

At time t3, the site A is in the state a3 in which the user is absent and not watching the spatial image information regarding the site B. The site B is in the state b2 in which the user is absent and not watching the spatial image information regarding the site A. Thus, for the communication from the site B to the site A, the energy-saving and bandwidth-saving determination process is performed in such a manner as to stop transmitting the spatial image information regarding the site B. Further, at the site A, the energy-saving and bandwidth-saving determination process is carried out to turn off power to the display apparatus.

At time t4, the site A is in the normal state a4 in which the user is present and watching the spatial image information regarding the site B. The site B is in the state b2 in which the user is absent and not watching the spatial image information regarding the site A. Thus, for the communication from the site B to the site A, the energy-saving and bandwidth-saving determination process is performed in such a manner as to start transmitting the spatial image information regarding the site B. Further, at the site A, the energy-saving and bandwidth-saving determination process is carried out to turn on the display apparatus.

At time t5, the site A is in the normal state a4 in which the user is present and watching the spatial image information regarding the site B. The site B is in the normal state b5 in which the user is present and watching the spatial image information regarding the site A. Thus, for the communication from the site A to the site B, the energy-saving and bandwidth-saving determination process is performed in such a manner as to start transmitting the spatial image information. Further, at the site A, the energy-saving and bandwidth-saving determination process is also carried out in a manner increasing the resolution of the spatial image information. At the site B, the energy-saving and bandwidth-saving determination process is performed to turn on the display apparatus. Further, for the communication from the site B to the site A, the energy-saving and bandwidth-saving determination process is carried out in a manner increasing the frame rate of the spatial image information regarding the site B.

<Example of Bandwidth-Saving Control at Sites>

Figure 12:
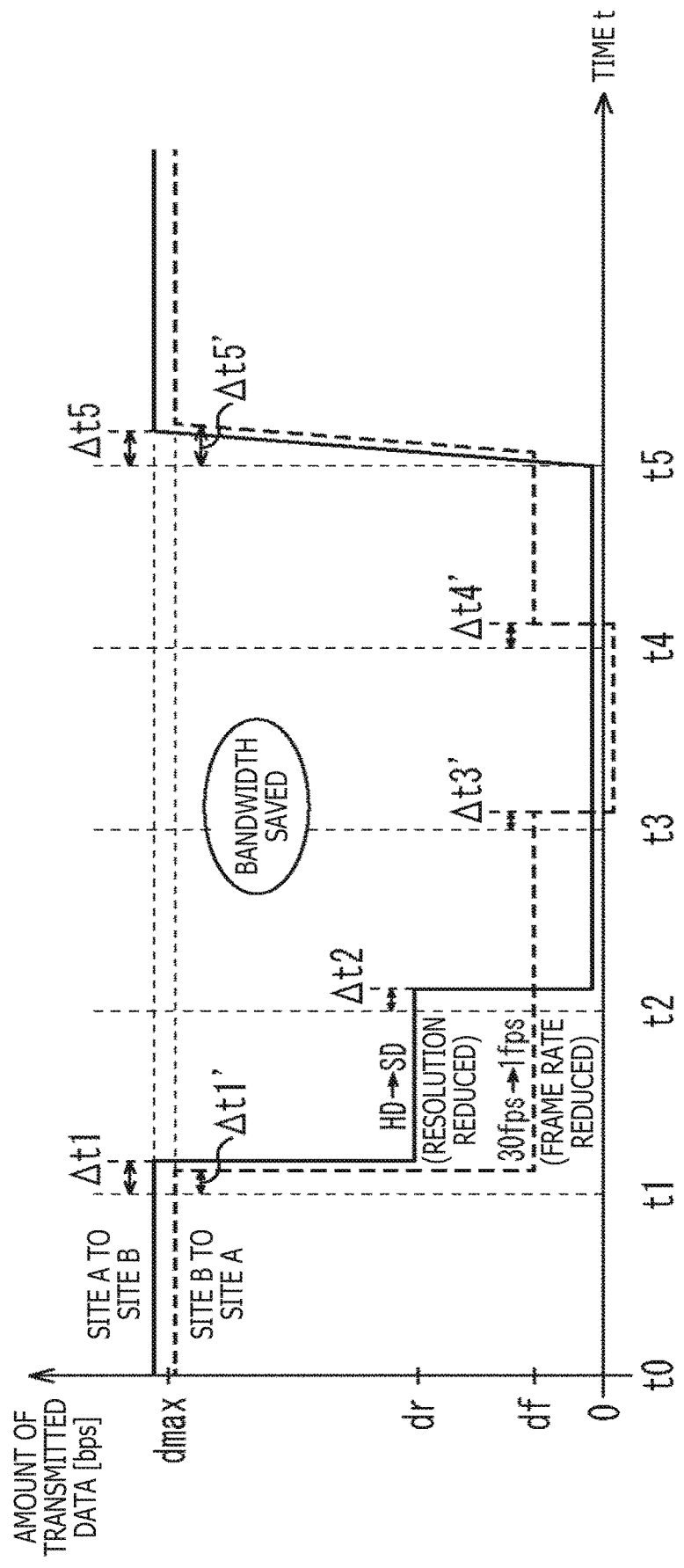
FIG. 12 is a view depicting levels and timings of a bandwidth-saving control process based on the energy-saving and bandwidth-saving determination process in FIG. 11.

FIG. 12 is a view depicting levels of bandwidth-saving control based on the result of the energy-saving and bandwidth-saving determination process in FIG. 11.

In FIG. 12, the vertical axis denotes the amount of transmitted data, and the horizontal axis represents time. Time t0 through time t5 in FIG. 12 correspond to time t0 through time t5 in FIG. 11, respectively.

In FIG. 12, solid lines denote levels of bandwidth-saving control over the communication from the site A to the site B, and broken lines represent levels of bandwidth-saving control over the communication from the site B to the site A. Note that reference signs $\Delta t$ each represent a processing delay time caused by change of parameters.

At time t1, bandwidth-saving control is performed on the communication from the site A to the site B in a manner reducing the resolution of the spatial image information from HD down to SD. This reduces the amount of transmitted data from an amount dmax down to an amount dr (dr<dmax) upon elapse of $\Delta t1$. Further, over the communication from the site B to the site A, bandwidth-saving control is performed in a manner reducing the frame rate from 30 fps down to 1 fps. This reduces the amount of transmitted data from the amount dmax down to an amount df (df<dr) upon elapse of $\Delta t1$.

At time t2, bandwidth-saving control is performed on the communication from the site A to the site B in such a manner as to stop transmission of the spatial image information. This brings the amount of transmitted data from the amount dr to an amount 0 upon elapse of $\Delta t2$.

At time t3, bandwidth-saving control is performed on the communication from the site B to the site A in such a manner as to stop transmission of the spatial image information. This brings the amount of transmitted data from the amount df to the amount 0 upon elapse of $\Delta t3'$.

At time t4, bandwidth-saving control is performed on the communication from the site B to the site A in such a manner as to start transmission of the spatial image information. This increases the amount of transmitted data from the amount 0 up to the amount df upon elapse of $\Delta t4'$.

At time t5, bandwidth-saving control is performed on the communication from the site A to the site B in such a manner as to start transmission of the spatial image information and to increase the resolution thereof. This increases the amount of transmitted data from the amount 0 up to the amount dmax upon elapse of $\Delta t5$. Further, over the communication from the site B to the site A, bandwidth-saving control is performed to increase the frame rate of the spatial image information. This increases the amount of transmitted data from the amount df up to the amount dmax upon elapse of $\Delta t5'$.

In the case where bandwidth-saving control is not performed, the transmitted data amount dmax would remain unchanged from time t1 to time t5 in the communication from the site A to the site B or vice versa. Carrying out bandwidth-saving control reduces the use of that portion of bandwidth that is indicated to be saved in FIG. 12.

<Example of Energy-Saving Control at Sites>

Figure 13:
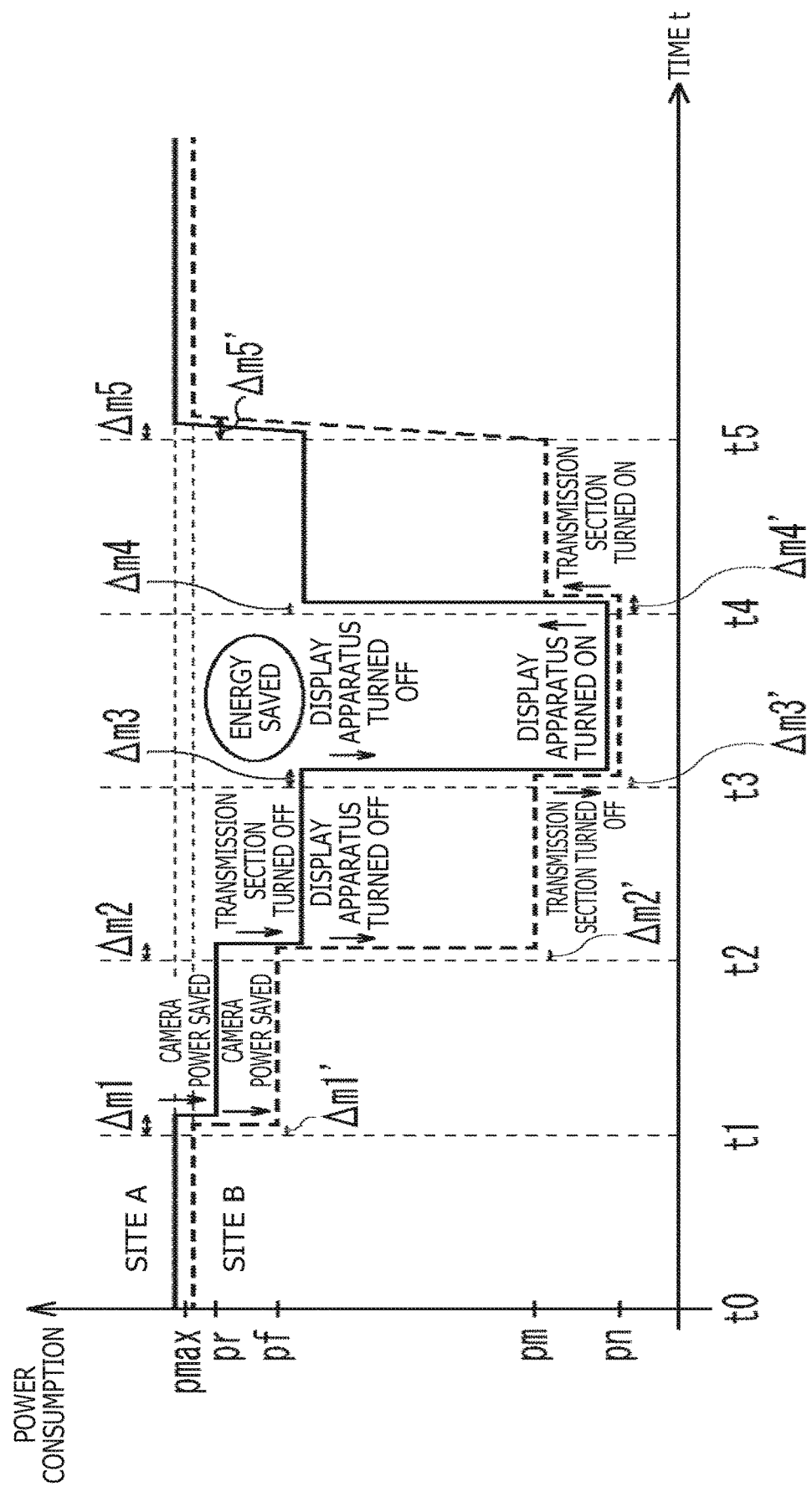
FIG. 13 is a view depicting levels and timings of an energy-saving control process based on the energy-saving and bandwidth-saving determination process in FIG. 11.

FIG. 13 is a view depicting levels of energy-saving control based on the result of the energy-saving and bandwidth-saving determination process in FIG. 11.

In FIG. 13, the vertical axis denotes the amount of power consumption, and the horizontal axis represents time. Time t0 through time t5 in FIG. 13 correspond to time t0 through time t5 in FIG. 11, respectively.

In FIG. 13, solid lines denote levels of energy-saving control at the site A, and broken lines represent levels of energy-saving control at the site B. Note that reference signs $\Delta m$ each represent a processing delay time caused by change of parameters.

At time t1, energy-saving control is performed on the camera at the site A by reducing the camera resolution of the input section 51. This reduces the amount of power consumption from an amount pmax down to an amount pr upon elapse of $\Delta m1$. Further, at the site B, energy-saving control is carried out on the camera by reducing the camera frame rate of the input section 51. This reduces the amount of power consumption from the amount pmax down to an amount pf (pf<pr) upon elapse of $\Delta m1'$.

At time t2, energy-saving control is performed at the site A by turning off the transmission section 101 to stop transmission of the spatial image information. This reduces the amount of power consumption from the amount pr down to the amount pf upon elapse of $\Delta m2$. Further, at the site B, energy-saving control is carried out on the display apparatus of the output section 57 by turning off the display apparatus. This reduces the amount of power consumption from the amount pf down to an amount pm (pm<pf) upon elapse of $\Delta m2'$.

At time t3, energy-saving control is performed on the display apparatus of the output section 57 by turning off the display apparatus, at the site A. This reduces the amount of power consumption from the amount pf down to an amount pn (pn<pm) upon elapse of $\Delta m3$. Further, at the site B, energy-saving control is carried out by turning off the transmission section 101 to stop transmission of the spatial image information. This reduces the amount of power consumption from the amount pm down to the amount pn upon elapse of $\Delta m3'$.

At time t4, energy-saving control is performed on the display apparatus of the output section 57 by turning on the display apparatus, at the site A. This increases the amount of power consumption from the amount pn up to the amount pf upon elapse of $\Delta m4$. Further, at the site B, energy-saving control is carried by turning on the transmission section 101 to start transmission of the spatial image information. This increases the amount of power consumption from the amount pn up to the amount pm upon elapse of $\Delta$m4'.

At time t5, energy-saving control is performed by turning on the transmission section 101 and by increasing the camera resolution of the input section 51, at the site A. This increases the amount of power consumption from the amount pf up to the amount pmax upon elapse of $\Delta$m5. Further, at the site B, energy-saving control is carried out by turning on the display apparatus of the output section 57 and by increasing the camera frame rate of the input section 51. This increases the amount of power consumption from the amount pm up to the amount pmax upon elapse of $\Delta$m5'.

Explained above are the examples in which the information processing apparatuses 11A and 11B perform bidirectional communication therebetween. Explained below is how energy-saving and bandwidth-saving control is carried out in the case of multidirectional communication among the information processing apparatuses 11A through 11C.

4. Alternative Examples

<Examples of Output Information>

Figure 14:
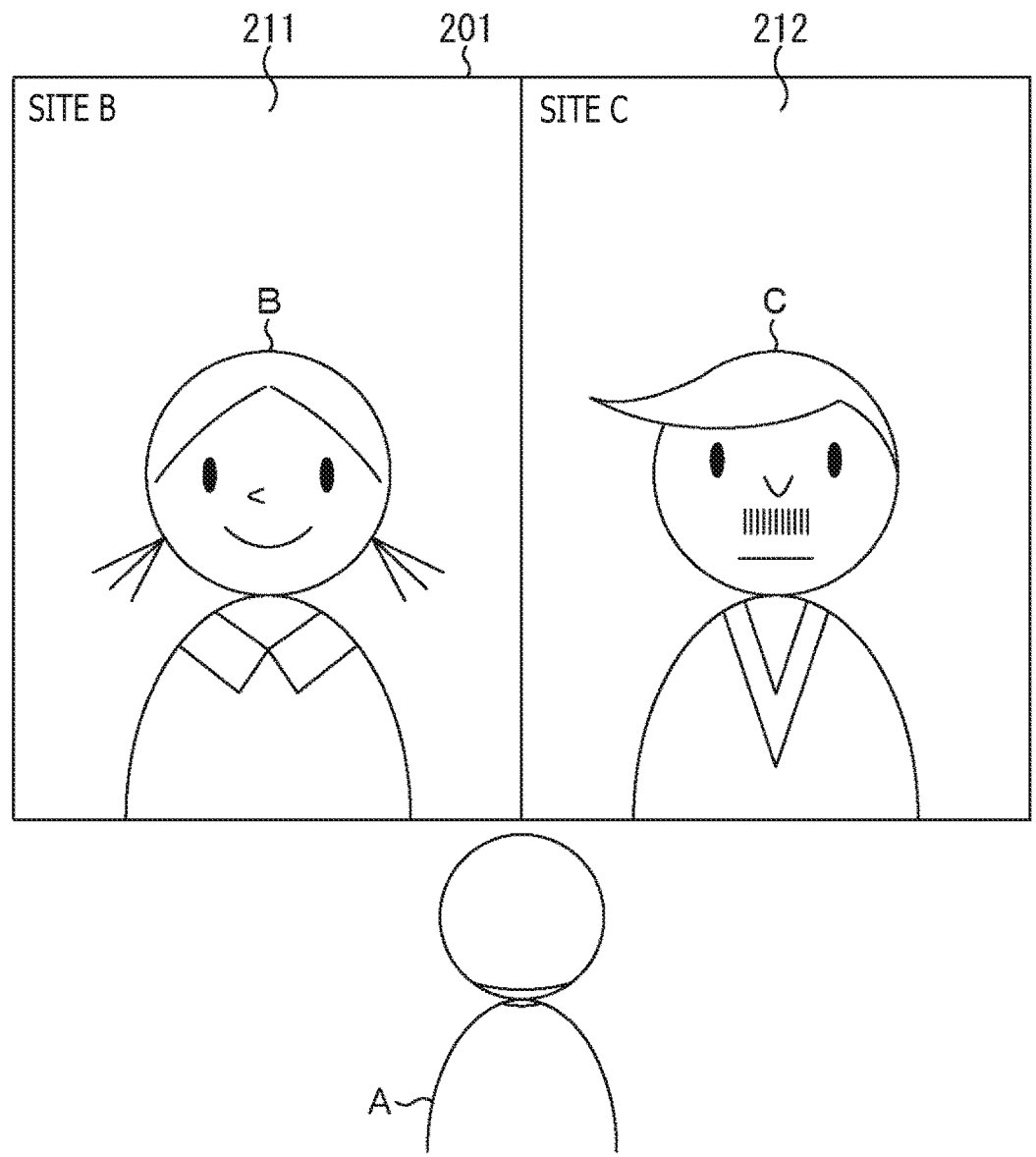
FIG. 14 is a view depicting another example of the output information.

FIG. 14 is a view depicting another example of the output information.

Output information 201 in FIG. 14 is information displayed at the site A, which is the space of the user A. The output information 201 is displayed by the information processing apparatus 11A arranged at the site A.

The output information 201 includes spatial image information 211 including the site B, which is the space of the user B, and spatial image information 212 including the site C, which is the space of the user C. The spatial image information 211 is substantially the same in size as the spatial image information 212.

In the example of FIG. 14, it is assumed that the user B is present at the site B and the user C is present at the site C. In such a state, a conversation is assumed to be taking place among the three users.

The information processing apparatuses 11A to 11C share context information regarding the site A, context information regarding the site B, and context information regarding the site C among them. The information processing apparatuses each determine energy-saving and bandwidth-saving control optimal for the site A through the site C by combining the states of the users at these sites.

In that state, in the case where the user C goes outside, for example, the information processing apparatus 11A at the site A performs energy-saving control in such a manner as to increase the display size of the spatial image information regarding the site B and to reduce the display size of the spatial image information regarding the site C. Alternatively, the display of the spatial image information regarding the site C may be turned off instead of having that information displayed in a reduced size.

Further, because the user at the site C is absent, the information processing apparatus 11B combining the states of the users at the sites A through C performs bandwidth-saving control in a manner increasing the resolution of the spatial image information sent from the site B to the site A.

The above-described energy-saving and bandwidth-saving determination process allows the site A to display output information 221 such that only the user B at the site B appears in a large size as depicted in FIG. 15. Because the user C at the site C is absent, the output information 221 gives large-size display of spatial image information 231 in which the user B appears but small-size display of spatial image information representing the appearances of the site C.

5. Conclusion

As described above, with multiple items of context information regarding a group of sites shared in the multidirectional communication system 1, the energy-saving and bandwidth-saving determination process is performed in a manner sustaining the continued sense of connection by combining the states of multiple users. This provides compression of the transmitted data and saves the power consumed by the configured functions.

For example, according to the technology disclosed by JP 2011-61300A, face information is combined with movement information and multiple operation modes are switched manually or automatically in order to improve accuracy and to promote practical implementation. However, the energy-saving effects of the disclosed technology are limited to the terminal only on one side through the use of the context information regarding the site on one side alone.

According to the technology disclosed by JP 2008-294564A, for bidirectional communication in an environment that requires management of confidential information, character-string context information is manually set by users daily in a deliberate manner. The mandatory daily setting by the users can generate a sense of bother and lead to the loss of the sense of casual connection between adjacent spaces. Furthermore, the stress of bothering to do the setting can prevent the users from updating the information accurately in a highly frequent manner.

The present technology, by contrast, provides the users with a sense of spatial connection, allowing them to feel as if their spaces are connected to one another, with no need for the users to deliberately perform such operations as connection ON/OFF processes in daily use.

According to the present technology, the states of the users are determined on the basis of individual items of context information acquired in combination from the users' connected spaces and from the group of the configured apparatuses. This makes it possible to optimize the control on the individual apparatuses and on communication in multiple directions therebetween.

Multidirectional communication systems are being improved in capability for higher quality, larger capacity, and more multi-stream options so as to support heavier loads and wider bandwidth in an accelerated manner. Against such developments, the present technology makes it possible to recognize and make better use of the states of the users including the points of gaze, levels of consciousness, and degrees of cognizance. This leads to drastic reduction of redundantly transmitted data and unnecessarily executed device control.

When the states of the users are thus used, the sensing of the user's states, synchronization among the information processing apparatuses, and an illusion of the sustained sense of being present may be better employed for more advantageous effects. Note that the user's states are sensed through the use of deep learning operations based on information from diverse sensors or on combinations of diverse information.

Further, in order to put the present technology into practical use as products and services, multiple operation modes may be provided to adjust and select the operation that is optimal for users and the environment, the modes including one that emphasizes the sense of connection while going easy on the energy-saving or bandwidth-saving effects, and one that stresses the energy-saving or bandwidth-saving effects while giving a reduced sense of connection. These multiple operation modes may be configured to be switched manually or automatically and may be provided with a monitoring function permitting verification of the expected effects.

6. Others

The above-described series of the processes performed by the server may be executed either by hardware or by software. In the case where the series of the processing is to be carried out by software, the programs constituting the software are installed into a suitable computer incorporated in dedicated hardware or into a general-purpose computer or like equipment from a program recording medium.

The programs to be installed are recorded on removable media 61 including optical discs (CD-ROM (Compact Disc-Read Only Memory), DVD (Digital Versatile Disc), etc.) and a semiconductor memory when offered, the removable media 61 being driven by the drive 60. The programs may also be offered via wired or wireless transmission media such as local area networks, the Internet, and digital satellite broadcasting. The programs may alternatively be preinstalled in the ROM 52 or in the storage section 58.

Note that the programs to be executed by the computer may each be processed chronologically, i.e., in the sequence depicted in this description, in parallel with other programs, or in an otherwise appropriately timed fashion such as when the program is invoked as needed.

Further, in this description, the term "system" refers to an aggregate of multiple components (e.g., apparatuses or modules (parts)). It does not matter whether all components are housed in the same enclosure. Thus, a system may be configured with multiple apparatuses housed in separate enclosures and interconnected via a network or with a single apparatus in a single enclosure that houses multiple modules.

Note that the advantageous effects stated in this description are only examples and not limitative of the present technology that may also provide other advantages.

The present technology is not limited to the embodiments discussed above and may be implemented in diverse variations so far as they are within the spirit and scope of this technology.

For example, the present technology may be implemented as a cloud computing setup in which a single function is processed cooperatively by multiple networked apparatuses on a shared basis.

Also, each of the steps discussed in reference to the above-described flowcharts may be executed either by a single apparatus or by multiple apparatuses on a shared basis.

Furthermore, in the case where a single step includes multiple processes, these processes may be executed either by a single apparatus or by multiple apparatuses on a shared basis.

<Typical Combinations of the Configured Components>

The present technology may also be implemented preferably in the following configurations.

(1)
A space information sharing apparatus including:
a control section configured to control communication of space information indicative of appearances of a space of a first user to an apparatus of a second user, on the basis of first sensing information representative of a state of the first user and second sensing information representative of a state of the second user.

(2)
The space information sharing apparatus as stated in paragraph (1) above, in which the control section controls a frame rate of the communication to the apparatus of the second user.

(3)
The space information sharing apparatus as stated in paragraph (1) or (2) above, in which the control section controls image resolution of the communication to the apparatus of the second user.

(4)
The space information sharing apparatus as stated in any one of paragraphs (1) to (3) above, in which the control section controls an operating status of components of the space information sharing apparatus.

(5)
The space information sharing apparatus as stated in paragraph (4) above, in which the control section controls the operating status of an imaging section configured to capture the space of the first user.

(6)
The space information sharing apparatus as stated in paragraph (4) or (5) above, in which the control section controls the operating status of a transmission section configured to transmit the space information regarding the first user to the apparatus of the second user.

(7)
The space information sharing apparatus as stated in any one of paragraphs (4) to (6) above, further including:
a reception section configured to receive space information indicative of appearances of a space of the second user,
in which the control section controls the operating status of a presentation section configured to present the first user with the received space information regarding the second user.

(8)
The space information sharing apparatus as stated in any one of paragraphs (1) to (7) above,
the space information sharing apparatus operating in one of two operation modes, one mode being a connection priority mode giving priority to connecting the communication, the other mode being a bandwidth-saving priority mode giving priority to saving bandwidth for the communication;
the space information sharing apparatus further including a switching section configured to switch the operation mode either to the connection priority mode or to the bandwidth-saving priority mode,
in which the control section controls the communication to the apparatus of the second user on the basis of the mode having been switched to.

(9)
The space information sharing apparatus as stated in any one of paragraphs (1) to (8) above, in which the control section controls the communication of the space information regarding the first user to the apparatus of the second user on the basis of third sensing information representative of a state of a third user.

(10)
A space information sharing method including:
causing a space information sharing apparatus to control communication of space information indicative of appearances of a space of a first user to an apparatus of a second user, on the basis of first sensing information representative of a state of the first user and second sensing information representative of a state of the second user.

(11) A program for causing a computer to function as a control section configured to control communication of space information indicative of appearances of a space of a first user to an apparatus of a second user on the basis of first sensing information representative of a state of the first user and second sensing information representative of a state of the second user.

REFERENCE SIGNS LIST

1 Multidirectional communication system, 11, 11A-11C Information processing apparatus, 12 Server, 13 Network, 51 CPU, 56 Input section, 57 Output section, 58 Storage section, 59 Communication section, 81 Context analysis section, 82 UI section, 83 Control section, 91 State determination section, 101 Transmission section, 102 Reception section

The invention claimed is:

1. A space information sharing apparatus comprising:
a control section configured to control communication of space information indicative of appearances of a space of a first user to an apparatus of a second user, on a basis of first sensing information representative of a state of the first user and second sensing information representative of a state of the second user,
wherein the control section is further configured to change a frame rate or an image resolution of the communication to the apparatus of the second user on the basis of the first sensing information and the second sensing information,
wherein the state of the first user indicates whether or not the first user is present in the space of the first user and the state of the second user indicates whether or not the second user is present in a space of the second user, and
wherein the control section is implemented via at least one processor.

2. The space information sharing apparatus according to claim 1, wherein the control section is further configured to control the frame rate of the communication to the apparatus of the second user on the basis of the first sensing information and the second sensing information.

3. The space information sharing apparatus according to claim 1, wherein the control section is further configured to control the image resolution of the communication to the apparatus of the second user on the basis of the first sensing information and the second sensing information.

4. The space information sharing apparatus according to claim 1, wherein the control section is further configured to control an operating status of components of the space information sharing apparatus on the basis of the first sensing information and the second sensing information.

5. The space information sharing apparatus according to claim 4, wherein the control section is further configured to control the operating status of an imaging section configured to capture the space of the first user on the basis of the first sensing information and the second sensing information.

6. The space information sharing apparatus according to claim 4, wherein the control section is further configured to control the operating status of a transmission section configured to transmit the space information regarding the first user to the apparatus of the second user, on the basis of the first sensing information and the second sensing information.

7. The space information sharing apparatus according to claim 4, further comprising:
a reception section configured to receive space information indicative of appearances of a space of the second user,
wherein the control section is further configured to control the operating status of a presentation section configured to present the first user with the received space information regarding the second user on the basis of the first sensing information and the second sensing information, and
wherein the reception section is implemented via at least one processor.

8. The space information sharing apparatus according to claim 1,
wherein the space information sharing apparatus operates in one of two operation modes, one of the two operation modes being a connection priority mode giving priority to connecting the communication, another of the two operation modes being a bandwidth-saving priority mode giving priority to saving bandwidth for the communication,
wherein the space information sharing apparatus further comprises a switching section configured to switch the operation mode either to the connection priority mode or to the bandwidth-saving priority mode,
wherein the control section is further configured to control the communication to the apparatus of the second user on a basis of the mode having been switched to, and
wherein the switching section is implemented via at least one processor.

9. The space information sharing apparatus according to claim 1, wherein the control section is further configured to control the communication of the space information regarding the first user to the apparatus of the second user on a basis of third sensing information representative of a state of a third user.

10. A space information sharing method comprising:
causing a space information sharing apparatus to control communication of space information indicative of appearances of a space of a first user to an apparatus of a second user on a basis of first sensing information representative of a state of the first user and second sensing information representative of a state of the second user,
wherein the controlling of the communication of the space information includes changing a frame rate or an image resolution of the communication to the apparatus of the second user on the basis of the first sensing information and the second sensing information, and
wherein the state of the first user indicates whether or not the first user is present in the space of the first user and the state of the second user indicates whether or not the second user is present in a space of the second user.

11. A non-transitory computer-readable medium having embodied thereon a program, which when executed by a computer causes the computer to execute a space sharing information method, the method comprising:
controlling communication of space information indicative of appearances of a space of a first user to an apparatus of a second user on a basis of first sensing information representative of a state of the first user and second sensing information representative of a state of the second user,
wherein the controlling of the communication of the space information includes changing a frame rate or an image resolution of the communication to the apparatus of the second user on the basis of the first sensing information and the second sensing information, and wherein the state of the first user indicates whether or not the first user is present in the space of the first user and the state of the second user indicates whether or not the second user is present in a space of the second user.

\* \* \* \* \*